United States Patent Office 3,310,160
Patented Mar. 21, 1967

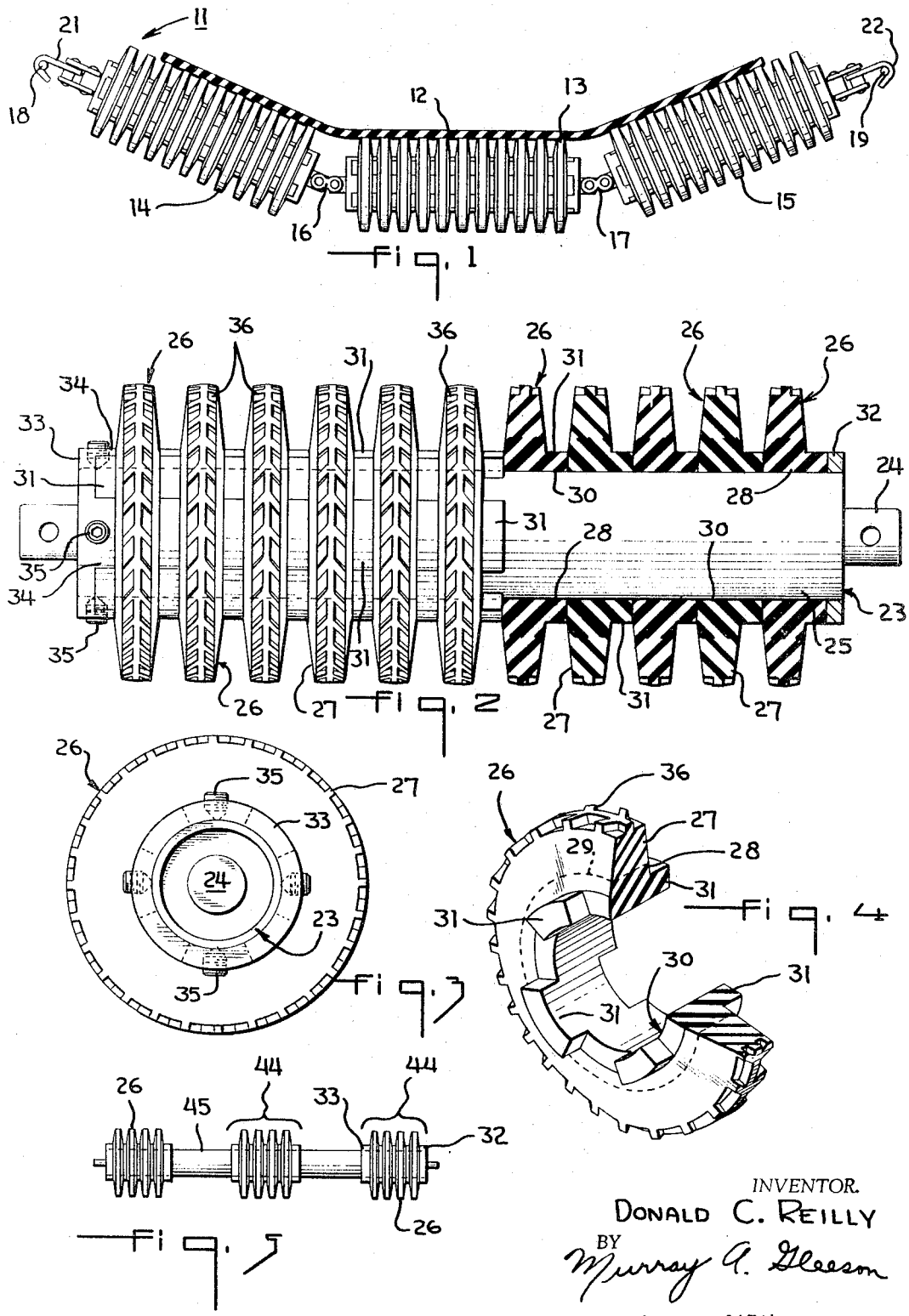

3,310,160
IMPACT ABSORBING ROLLER ASSEMBLY AND
ELEMENT THEREFOR
Donald C. Reilly, Downers Grove, Ill., assignor, by mesne assignments, to Westinghouse Air Brake Company, Pittsburgh, Pa., a corporation of Pennsylvania
Filed Apr. 27, 1965, Ser. No. 451,131
4 Claims. (Cl. 198—192)

This invention relates to belt conveyor idlers which are adapted to support an endless belt at loading points or other high impact areas, and more specifically relates to an impact cushioning element for such an idler.

In endless belt conveyor installations, the usual practice is to have loading stations at definite locations where material to be conveyed is deposited on the belt. The greatest expense in these conveyor installations is the endless belts themselves. The belts extend in many cases over great distances, and because of their length and construction are extremely expensive. The flexible nature and structure of these belts renders them susceptible to the laceration of the rubber covering and rupture of the carcass cords or fabric by heavy or sharp materials they may convey. This difficulty usually occurs at the loading station of the belt conveyor where the heavy and sharp materials strike the belt with considerable impact, and where there is not sufficient means to cushion the impact.

To protect the belt against these dangers, impact absorbing idler assemblies are usually placed in the conveyor line at the places of high impact or shock loads, which in some instances could extend the entire length of the conveyor. These idlers, in the past, have been expensive, difficult to manufacture and a problem to stock.

Early in the art it was found that a solid rubber ring around a steel roller shell would not afford enough cushioning to do an adequate job of impact absorption due to a lack of provision for the rubber to "flow" or deform. As the art advanced, slots or grooves were formed in a thick rubber ring to permit substantial deflection, and having energy absorbing capacity many times that of the first, smooth rubber-covered rollers. The diameters were enlarged and the width of the lands between the grooves were narrowed to provide a maximum degree of impact absorption. But, to provide a full range of impact idlers, a great many sizes had to be stocked.

To solve this problem, a series of tire-like elements or segments made of yieldable elastomer was used which could be mounted on a rotatable shaft means in a sufficient quantity to equal the widths required. This design, however, presented a difficulty in mounting the segments to the shaft. Often, one or more of the segments would loosen and friction caused by slippage would soon destroy the segment and present a serious danger to the belt.

To improve the mounting technique, a comparatively hard rubber segment with a wide hub portion came into use. In some instances, steel mounting rings were bonded to the inside diameter of the segments with a key used to lock the elements to the shaft means. The hard rubber did not provide sufficient cushioning. To allow greater deformation and therefore greater impact absorption by the idler, the tire-like segments were narrowed at the circumference to small tapering tips. This left a large proportion of the belt unsupported by the idler and imposed excess shear loads on the belt carcass.

Another type of impact idler consisted of a row of pneumatic tires mounted on a rotatable shaft, but these were far too large in diameter for all but a few applications.

Accordingly, a primary object of this invention is to provide an impact absorbing idler, designed to overcome the foregoing difficulties.

Another object is to provide an improved impact absorbing element, a number of which can be axially stacked on a rotatable shaft in interlocking relationship to form a unitary impact absorbing idler of any desired length adapted to provide support for a moving conveyor belt.

A further object is to provide an impact absorbing element having an annular tire portion of a large diameter and a hub portion of a considerably smaller diameter but substantially longer than said tire portion to axially space the tire portions of adjacent elements apart when a series of elements are telescopically stacked on a shaft means, so that said tire portions are capable of a higher degree of deformation when subjected to impact.

Still another object is to provide an impact absorbing element having an annular tire portion and an annular hub portion, both made of rubberlike materials formed integral with one another. The tire portion is formed of a relatively softer or more elastic material than the hub portion which, in turn, is formed of a comparatively hard material, to facilitate mounting and provide strength for jaw teeth formed with and extending axially from said hub.

Yet another object is to provide means to mount and secure the elements of this invention on a rotatable shaft means to function as a unitary impact absorbing idler assembly.

Another object is to provide an impact absorbing element having a center bore adapted to fit snugly and telescopically with other elements over a rotatable shaft means. Said shaft means is preferably in the form of a standard small diameter idler roller.

A further object is to provide an element having a tread formed on its circumferential supporting surface, which provides a rolling support for a return run of an endless belt adapted to pick up material adhering to the surface of the belt and fling it from the tread by centrifugal force.

Still another object is to provide an impact idler which can adequately support an endless belt. These and other objects will be apparent as the following description proceeds and with reference to the accompanying drawings wherein:

FIGURE 1 is an elevational view of an impact idler assembly embodying the principles of this invention;

FIG. 2 is an enlarged partial section view of one of the impact absorbing idlers, showing the interlock between elements and also showing the retaining means;

FIG. 3 is a side elevation of the idler shown in FIG. 2;

FIG. 4 is an isometric sectional view of one of the impact absorbing elements showing the locations of the two hardnesses of rubber; and FIG. 5 is a modified application of the invention, showing the impact absorbing elements applied to a return roller.

Like numerals refer to like parts throughout this description.

An impact idler assembly is indicated generally at 11 in FIG. 1. The idler assembly is adapted to support an endless flexible conveyor belt 12 in a trough-shaped configuration. The bottom of the belt trough is supported by horizontal idler 13, while the sides are supported by angled wing idlers 14 and 15. The idlers may be connected together in an articulated relationship by links 16, 17 and the entire assembly may be supported on rope sideframes 18, 19 by rope clamps 21, 22. However, this invention is not intended to be limited in scope or application to any single type of belt conveyor construction.

Each idler consists essentially of identical components, so only one will herein be described. A comparatively small diameter idler roller 23, complete with dead shaft 24, bearings (not shown) and shell 25 are preferably used as the rotatable shaft means for this invention. An entire conveyor can be installed using these small diameter idler assemblies, with impact absorbing elements 26 assembled on the idler assemblies encountering high impacts, such as would be found at loading stations. The impact absorbing elements are molded of a rubber or rubberlike material.

Referring now particularly to FIG. 4, each impact absorbing element 26 comprises an annular tire portion 27 having an annular hub portion 28 of a considerable smaller diameter. The hub portion 28, however, is substantially longer, measured along the axis of the element, than the tire portion 27. This extension of the hub portion serves to space the tire portions apart, a distance approximately equal to the thickness of a tire portion. These spaces allow the rubber to "flow" or deform. The hub extensions actually comprise jaw teeth 31 adapted to engage complementary teeth on adjacent elements. The wider hub also provides a more stable base for mounting the impact elements 26 on said shaft means 23. The hub portions 28 telescopically interlock with one another and have a center bore 30 adapted to fit snugly over rotatable shaft means 23 and lock thereto in a manner which will be described later.

The element 26 has its tire portion 27 formed of a relatively soft deformable elastomer such as rubber, having a hardness approximately 60 to 70 durometer. The hub portion 28, on the other hand, is formed of a much harder material such as rubber, approximately 85 to 95 durometer. As best seen in FIG. 4, dotted line 29 indicates the dividing line between the two hardnesses. Said element 26 is molded into one integral piece providing impact cushioning at the periphery and hardness and strength at the hub. This is made possible by first molding the hub portion 28 and pre-curing it, then the tire portion is molded to the hub portion and a final cure is provided to insure bonding of the two hardnesses of rubber.

The interlocking jaw teeth 31 are of sufficient body to provide a torque drive between hub portions 28 of the elements 26, thereby preventing the elements from rotating relative to one another. Retaining rings 32, 33 located at opposite ends of the axially stacked elements also have jaw teeth 34 engaging complementary teeth 31 on the adjacent end elements of the stack. Said retaining rings 32, 33 are pressed together, when assembled, displacing some of the rubber of the hub portions 28, thereby slightly decreasing the center bores 30 and achieving a snug friction fit between the shaft means 23 and the elements 26. The retaining rings 32, 33 are then locked on the shaft means by set screws 35 threaded into the jaw teeth 34 of said retaining rings.

The interlocking relationship between the stacked elements and the positive manner of securing them to the shaft means provides a unitary impact absorbing idler assembly. It is imperative that there be no slippage or relative movement between elements or between the elements and the shaft means, because either of these conditions will cause friction and wear. Excess wear can destroy an element in a short time and excess friction may result in a fire.

Because this invention permits the use of a comparatively soft rubber, the tire portions 27 are made considerably wider than the elements of prior designs, yet are able to afford a maximum cushioning of the belt when subected to impacts, thus providing an area of greater support for the belt, and relieving the belt carcass of much strain.

The element 26 has yet another application. To prevent slippage of the belt, it is essential that the belt surface be free of foreign matter when it comes into contact with the drive pulleys. To this end, one or more groups 44 of elements 26 can be mounted on each return roller 45 for belt cleaning purposes. Treads 36 formed in the carrying surfaces of the elements 26, pick up debris clinging to the carrying surface of the belt, the circumferential speed produces centrifugal forces capable of throwing off the fragments picked up by the treads 36.

A return belt run carries no load, so large unsupported areas can readily be endured. Elements 26 can thus be arranged in irregularly spaced patterns on successive idlers, so that the entire width of a conveyor belt will come into contact with one or more of the elements before reaching the drive pulleys, enabling the use of fewer elements for belt cleaning.

From the foregoing, it will be seen that with this invention one basic type of impact absorbing element can be stocked, which will provide an inexpensive, readily available impact idler in any size requirement. Segments have the advantage that a given stack or group will generally conform to the length of any roller. Using a standard small diameter idler as the shaft means eliminates the need for a special, relatively expensive shaft.

While one embodiment of the invention has been illustrated and described, it will be appreciated that modifications of this embodiment may be made without departing from the spirit and scope of the invention as defined by the appended claims.

I claim as my invention:

1. An impact absorbing element for a belt conveyor roller comprising an annular tire portion having an annular hub portion of lesser diameter, said hub portion having a center bore adapted to fit snugly and telescopically over a rotatable shaft, both of said portions comprising elastomeric materials formed integral with one another, the hub portion being of relatively harder material than the tire portion, the tire portion consisting of relatively more elastic material than the hub portion, the hub portion being formed with axially extending jaw teeth adapted to engage complementary teeth on an adjacent element or retaining ring, and said tire portion having circular cross section outer surface adapted to provide a rolling support for a moving conveyor belt.

2. An impact absorbing element according to claim 1 in which the hub portion is substantially longer, measured along the axis of the element, than the tire portion whereby to axially space the tire portions of adjacent elements apart approximately the length of the teeth on the hub portions.

3. An impact absorbing element according to claim 2 in which a tread is formed in the circumferential surface of the tire portion.

4. An impact absorbing roller assembly comprising a rotatable shaft, a series of impact absorbing elements mode of elastomeric material telescopicaly mounted in an axial stack on the said shaft, interlocking jaw teeth between hub portions of adjacent elements preventing the elements from rotating relative to one another, and retaining rings at opposite ends of the stack having jaw teeth engaging complementary teeth on the end elements of the stack and secured to the rotatable shaft to maintain the shaft and the elements and the rings as a unitary rotatable impact absorbing assembly, each of said impact absorbing elements comprising a toothed hub portion with an integral external tire portion, the hub portion being of relatively harder elastomeric material than the tire portion, and the tire portion being of relatively more elastic rubberlike material than the hub portion.

References Cited by the Examiner

UNITED STATES PATENTS 2,596,499   5/1952   Mercier _____ 198—192 X
3,064,796   11/1962  Orwin _____ 198—192

FOREIGN PATENTS 1,182,144   11/1964   Germany.

EVON C. BLUNK, *Primary Examiner.*
MARVIN A. CHAMPION, *Examiner.*
A. C. HODGSON, *Assistant Examiner.*